(No Model.) 4 Sheets—Sheet 1.

A. D. PICKENS.
PLANT PROTECTING AND IRRIGATING APPARATUS.

No. 468,536. Patented Feb. 9, 1892.

WITNESSES
Helmuth Holtz
Perry D. Parks

INVENTOR
Andrew D. Pickens.
by W. R. Stringfellow
Attorney (No Model.) 4 Sheets—Sheet 2.
A. D. PICKENS.
PLANT PROTECTING AND IRRIGATING APPARATUS.
No. 468,536. Patented Feb. 9, 1892.
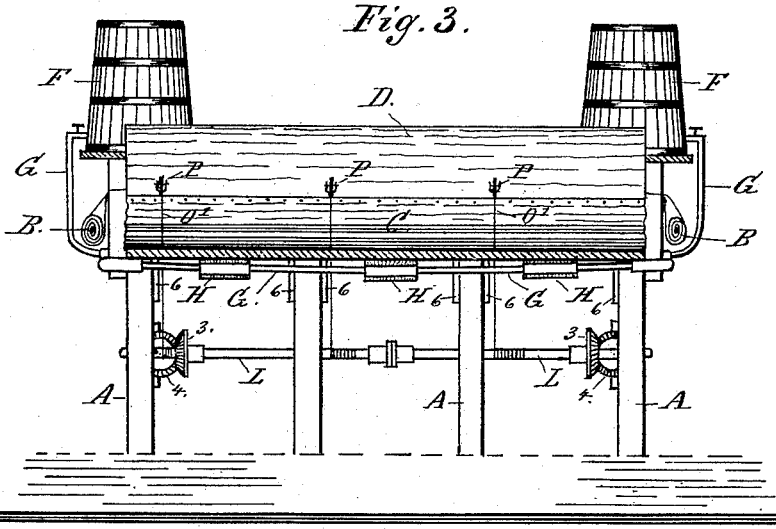
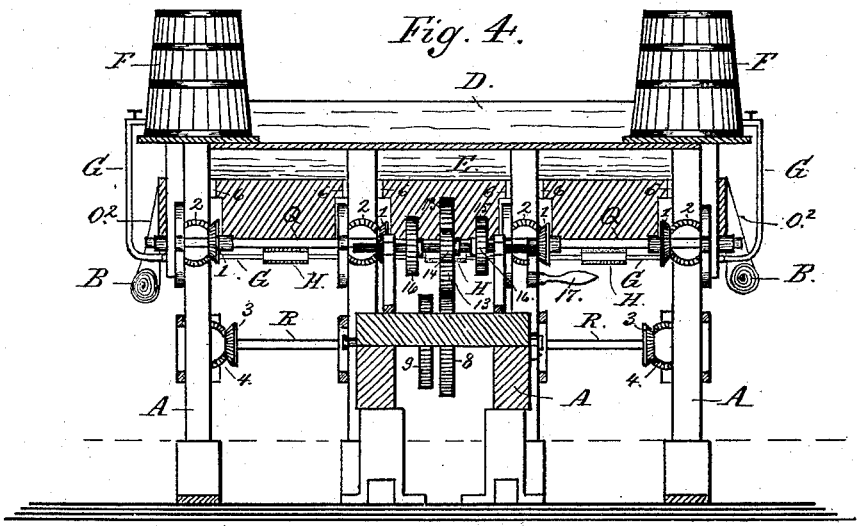
WITNESSES
Helmuth Holtz
Perry D. Parks
INVENTOR
Andrew D. Pickens.
by W. R. Stringfellow
Attorney (No Model.) 4 Sheets—Sheet 3.
A. D. PICKENS.
PLANT PROTECTING AND IRRIGATING APPARATUS.
No. 468,536. Patented Feb. 9, 1892.
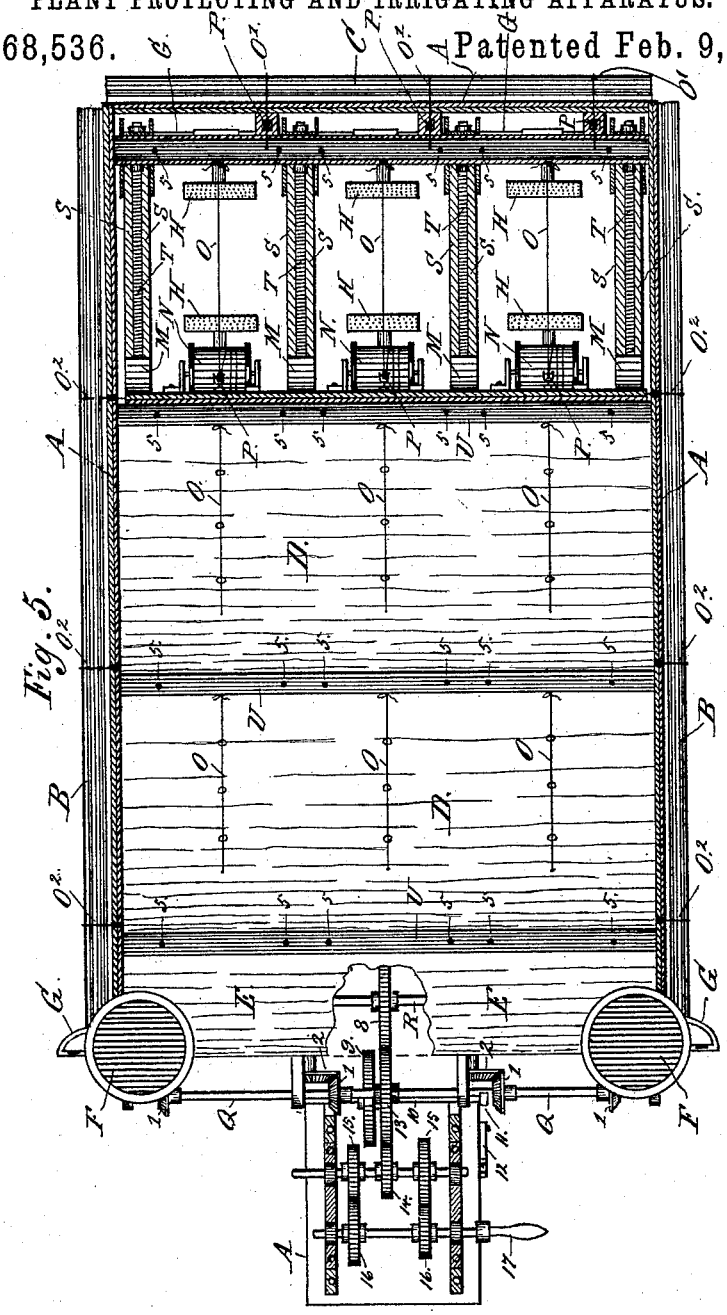
WITNESSES
INVENTOR
Andrew D. Pickens.
Attorney (No Model.) 4 Sheets—Sheet 4.
A. D. PICKENS.
PLANT PROTECTING AND IRRIGATING APPARATUS.
No. 468,536. Patented Feb. 9, 1892.
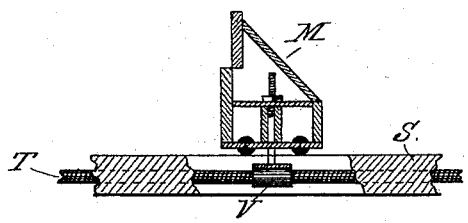
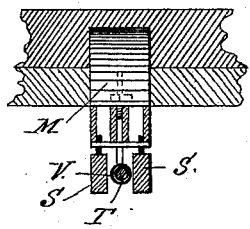
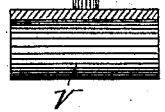
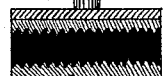
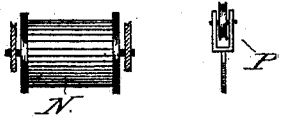
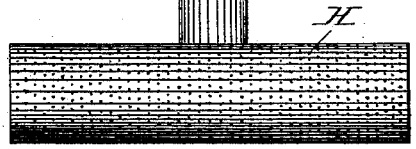
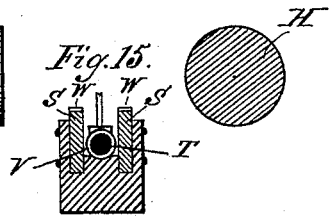
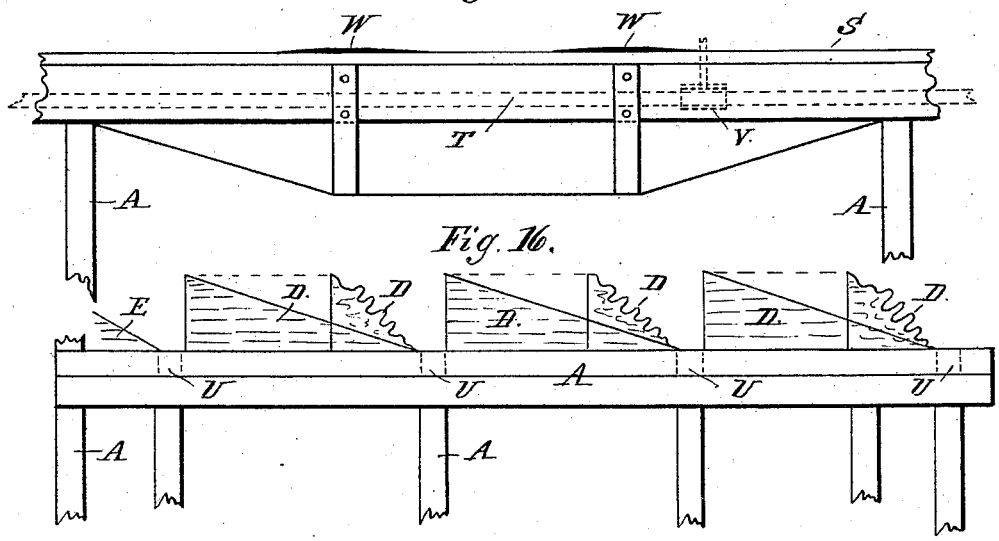
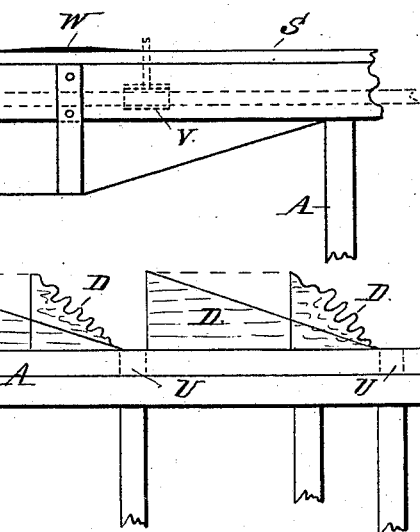
WITNESSES
Helmuth Holtz
Percy D. Parsle
INVENTOR
Andrew D. Pickens.
by W. R. Stringfellow
Attorney

UNITED STATES PATENT OFFICE.

ANDREW D. PICKENS, OF NEW ORLEANS, LOUISIANA.

PLANT PROTECTING AND IRRIGATING APPARATUS.

SPECIFICATION forming part of Letters Patent No. 468,536, dated February 9, 1892.

Application filed July 27, 1891. Serial No. 400,812. (No model.)

*To all whom it may concern:*

Be it known that I, ANDREW DYE PICKENS, a citizen of the United States, residing at New Orleans, in the parish of Orleans and State of Louisiana, have invented certain new and useful Improvements in Plant Protecting and Irrigating Apparatus; and I do declare the following to be a full, clear, and exact description of the invention, such as will enable others skilled in the art to which it appertains to make and use the same.

My invention relates to an improvement in a plant protecting and irrigating apparatus, and its novelty will be fully understood from the following description and claims when taken in connection with the annexed drawings; and the objects of my invention are to provide a device for protecting plants from the rays of the sun or extreme cold weather and enabling plants to be supplied with water when required.

I attain these objects by the mechanism illustrated in the accompanying drawings, in which—

Figure 1:
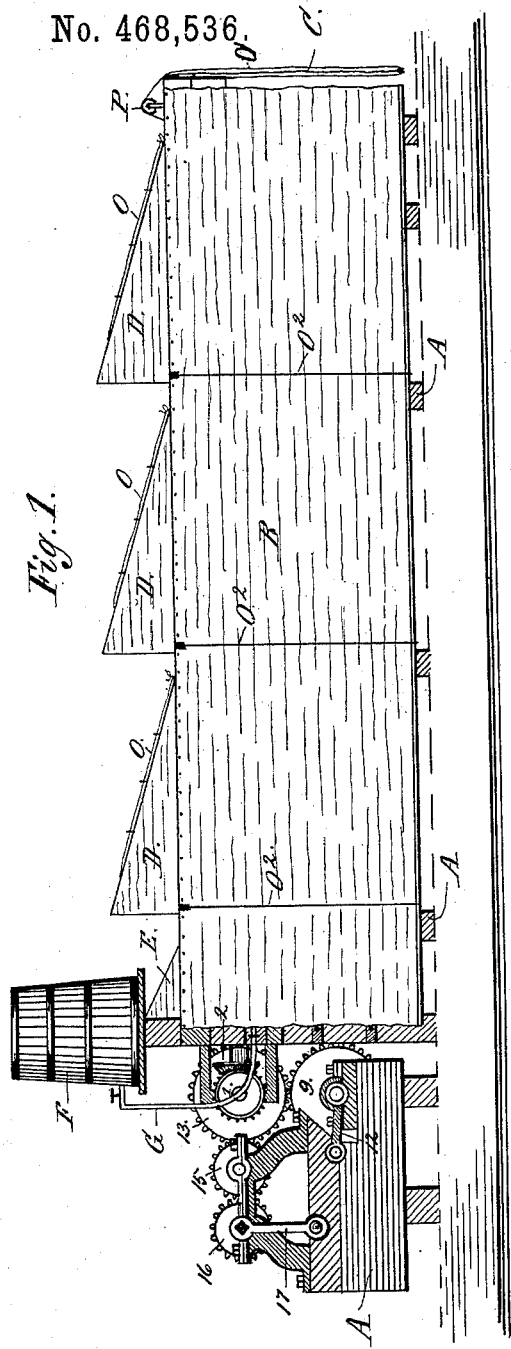
Figure 2:
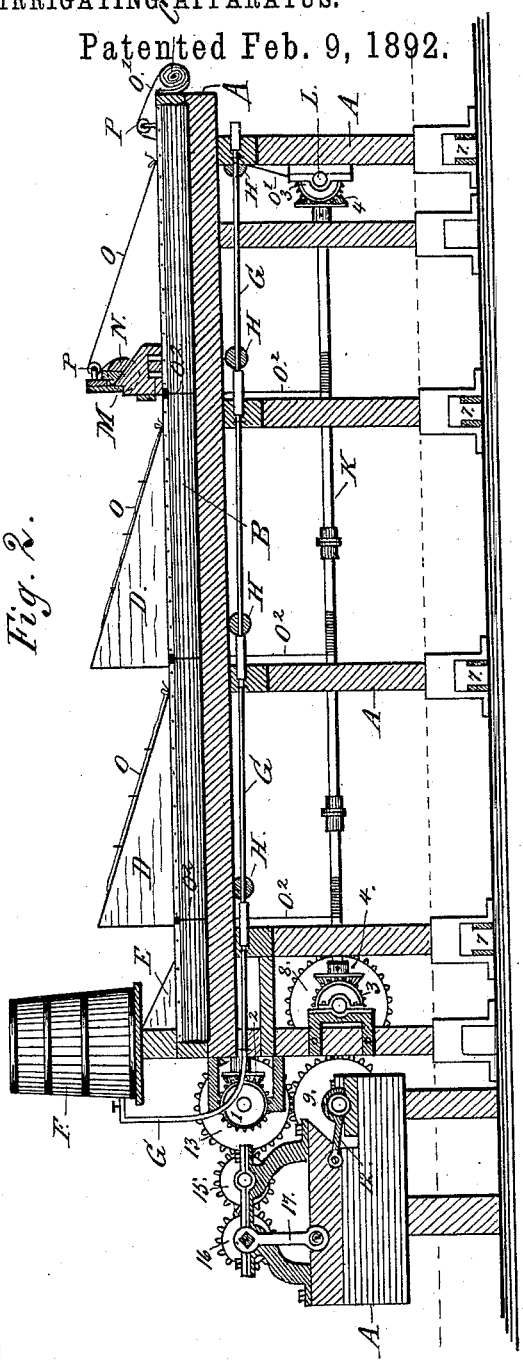

Figure 1 is a side view showing side awnings down and top awnings in position. Fig. 2 is a side view showing side and rear awnings raised. Fig. 3 is a rear view. Fig. 4 is a front view. Fig. 5 is a top view with one awning removed. Fig. 6 is a sectional side view of traveling crane. Fig. 7 is a rear view of traveling crane. Fig. 8 is a side view of hanger for screw. Fig. 9 is a longitudinal section of Fig. 8. Fig. 10 is a side view of drum upon which the awning-rope is wound. Fig. 11 is a front view of pulley. Fig. 12 is a top view of sprinkler. Fig. 13 is an end view of sprinkler. Fig. 14 is a sectional view of track for crane. Fig. 15 is an end view of Fig. 4. Fig. 16 is a sectional side view showing awnings compressed.

Similar letters and figures refer to similar parts throughout the several views.

In the drawings, A refers to frame of entire construction.

B are side awnings, which are provided with ropes $O^2$ and pulleys for raising and lowering same.

C is a rear awning provided with ropes O' and pulley P for raising and lowering same.

D are top awnings, which are provided with rope O for drawing same back and forth.

E is a stationary awning.

F are cisterns placed in an elevated position and which are filled with water in any desired manner.

G is a water-pipe leading from cisterns and provided with cocks.

H are sprinklers for distributing water upon plants.

K is a shaft by which awnings B are raised and lowered.

L is a shaft by which awning C is raised and lowered.

M is a traveling crane provided with a winding-drum N and over which rope O is wound.

Q is a shaft provided with spur-wheels and operates in conjunction with threaded screws T, which lie in a horizontal position between tracks S.

Attached to crane M is a hanger, as designated by V, and which has its interior surface threaded, so as to enable the crane M to travel back and forth upon screw T as they are rotated by shaft Q. At a point shown by W is an elevation which enables crane M to raise hanger V slightly, should it be necessary.

U are troughs.

R is a shaft provided with spur-wheels and which operates in conjunction with shafts K and L and raises and lowers awnings B and C.

5 are openings in troughs U and which convey rain-water from top of awnings D to trough 7. At a point shown by 8 on shaft R, I place a cog-wheel.

9 is a cog-wheel placed on a shifting shaft 10 and enables cog-wheel 9 to be thrown in and out of connection.

11 is a hand-piece for drawing shaft 10 back and forth.

12 is a catch or key for holding shaft 10 in a positive position when desired.

13 is a cog-wheel on shaft Q.

14, 15, and 16 are cog-wheels on crank-shafts, and 17 is a crank-handle.

In practice my invention can be constructed so as to cover an acre of ground, more or less, and when fully covering plants awnings B, C, and D occupy the position shown in Fig. 1. Should it be desired to raise side and rear awnings B and C, shaft R is rotated by means of cog-wheel 8, thus giving motion to shafts K and L, the latter connecting by means of spur-wheels 3 and 4. As the shafts K and L rotate, the ropes O' and O² are wound upon shafts, as shown in Figs. 2 and 3, and the awnings rolled up. The ropes in their movement pass over pulley P. Should it be desired to roll up the top awnings D, shaft Q is rotated, which puts in motion screws T, thus imparting motion to hangers V and cranes M, and ropes O are wound upon drums N. By simply reversing the movement of screws T the awnings D can be returned to their normal position, 1 and 2 being spur-wheels which connect shaft Q and screws T. Where it is desired to raise the top awnings D and not the side or rear awnings, motion is simply given the screws T by means of shaft Q. Where it is desired to simply raise the side and rear awnings, motion is given the shafts K and L by means of shaft R, the shaft 10 being shifted so as not to permit cog-wheel 9 to connect with a cog-wheel on shaft Q, and in this manner shaft Q remains stationary and the top awnings retain their normal position. Where it is desired to raise the side, rear, and top awnings, motion is given simultaneously to shafts R and Q, thus placing screws T and shafts K and L all in motion. The water flowing from cisterns through pipes G enters sprinklers H and is distributed upon plants.

In the drawings I have shown crank 17 for placing my device in motion, and on the opposite side, on shaft on which cog-wheels 15 are placed, a crank may also be attached and motion imparted; but, where desired, steam-power may be used.

Having described my invention, what I claim, and desire to secure by Letters Patent, is—

1. In a plant protecting and irrigating apparatus such as described, the combination of shafts R with shafts K and L for raising and lowering awnings B and C, for the purpose set forth.

2. In a plant protecting and irrigating apparatus such as described, the combination of shaft Q with screws T, track S, a traveling crane M, having a threaded hanger thereon, and a winding-drum which acts in unison with screws T, for the purpose set forth.

In testimony whereof I affix my signature in presence of two witnesses.

ANDREW D. PICKENS.

Witnesses:
G. REBENTISCH,
PERCY D. PARKS.